United States Patent
Hundscheidt et al.

(10) Patent No.: US 7,515,872 B2
(45) Date of Patent: Apr. 7, 2009

(54) DISTRIBUTED CACHING AND REDISTRIBUTION SYSTEM AND METHOD IN A WIRELESS DATA NETWORK

(75) Inventors: Frank Hundscheidt, Kerkrade (NL); Heino Hameleers, Kerkrade (NL); Ralf Keller, Würselen (DE); Thorsten Lohmar, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 34 days.

(21) Appl. No.: 10/556,179

(22) PCT Filed: May 9, 2003

(86) PCT No.: PCT/IB03/01826

§ 371 (c)(1),
(2), (4) Date: Mar. 6, 2007

(87) PCT Pub. No.: WO2004/100493

PCT Pub. Date: Nov. 18, 2004

(65) Prior Publication Data

US 2007/0243821 A1 Oct. 18, 2007

(51) Int. Cl.
*H04H 1/00* (2006.01)

(52) U.S. Cl. .................. 455/3.01; 455/414.1; 455/41.2; 455/3.03; 709/238; 709/245

(58) Field of Classification Search ............... 455/3.04, 455/3.01, 3.03–5, 415, 414.1, 418, 15, 432.3, 455/503, 502, 41.2, 9, 414.2–3, 412.2, 41.1, 455/412.1, 414.3; 705/1; 709/238, 245; 370/254, 432

See application file for complete search history.

(56) References Cited

U.S. PATENT DOCUMENTS

2002/0004816 A1* 1/2002 Vange et al. ................. 709/202
2002/0107935 A1* 8/2002 Lowery et al. .............. 709/216
2003/0028395 A1* 2/2003 Rodgers et al. ................. 705/1

FOREIGN PATENT DOCUMENTS

EP 1 282 029 A 2/2003
EP 1282029 2/2003

* cited by examiner

*Primary Examiner*—John J Lee

(57) ABSTRACT

A distributed caching and redistribution system, method, and mobile client for caching and redistributing data content in a wireless data network. The system enables mobile clients to cache data content that has been distributed by means of broadcast or multicast, and to redistribute the content from the cache to other users. Using anycast techniques applied to the PLMN, a user who wants to retrieve data that was distributed earlier locates the nearest user that has the content available, and asks the nearest user to forward the content. The "nearest" user may be the closest user, but may also be the optimal user from a Quality of Service (QoS) point of view.

22 Claims, 6 Drawing Sheets

DISTRIBUTED CACHING AND REDISTRIBUTION SYSTEM AND METHOD IN A WIRELESS DATA NETWORK

FIELD OF THE INVENTION

The present invention relates to wireless data networks. In particular, and not by way of limitation, the present invention is directed to a distributed caching system and method utilizing mobile clients to cache data content and redistribute the content to other users.

BACKGROUND ART

In the Third Generation Partnership Project (3GPP), multicast and broadcast is introduced in a work item referred to as Multimedia Broadcast/Multicast Service (MBMS). FIG. 1 is a simplified block diagram illustrating the current MBMS architecture, as defined in the stage 2 specification. The architecture utilizes network nodes from the General Packet Radio Service (GPRS) radio network.

With Digital Rights Management (DRM), the content is possibly encrypted and accompanied by a rights object. The rights object specifies what the user is allowed to do with the content. A basic concept with DRM is that charging/payment is based on the rights object and not on the content object since the value does not lie in the (possibly encrypted) content any longer, but in the rights to (possibly decrypt and) use the content.

From a content provider, a protected content object may be sent to a User Equipment (UE) mobile client through a Wireless Local Area Network (WLAN), or any other circuit-switched or packet-switched access network, including the Global System for Mobile Communications (GSM), General Packet Radio Service (GPRS), or a Universal Mobile Telecommunications System (UMTS) Terrestrial Radio Access Network (UTRAN). Meanwhile, the rights object may be sent from the content provider on a separate path through a Rights Server and a different Gateway GPRS Support Node (GGSN) and Serving GPRS Support Node (SGSN) before reaching the UTRAN and the mobile client. Thus, there is a potential distribution time and path difference between the content and the rights.

Anycast is an Internet network service that allows a sender to access the nearest of a group of receivers that share the same anycast address, where 'nearest' is defined according to the routing system's measure of distance. Anycasting is like multicasting in that the destination is a group of addresses, but instead of trying to deliver the packet to all of the members of the group, the network tries to deliver the message to only the nearest member. The source is not required to pick the closest destination, because the routing system figures it out. Usually the receivers in the anycast group are replicas, able to support the same service (for example, mirrored web servers). Thus, accessing the nearest receiver enhances the performance perceived by the sender, saves the network's bandwidth, and provides the desired service.

In IPv6, special anycast addresses have been specified in addition to the unicast and multicast addresses. An anycast address identifies a set of interfaces that typically belong to different nodes. A packet sent to an anycast address is delivered to the "nearest" interface identified by that address, according to the routing protocol's measure of distance. Anycast addresses are allocated from the unicast address space, using any of the defined unicast address formats. Thus, anycast addresses are syntactically indistinguishable from unicast addresses. When a unicast address is assigned to more than one interface, thus turning it into an anycast address, the nodes to which the address is assigned must be explicitly configured to know that it is an anycast address. Anycast addresses are only assigned to IPv6 routers, not to IPv6 hosts.

To join an anycast group, a host asks its first hop router to advertise the group's address on its behalf This communication may be achieved by adding a new message type to either the Internet Group Management Protocol (IGMP) or the Neighbor Discovery Protocol. The router then advertises the address according to the anycast routing protocol adopted by the domain.

In 3G wireless networks, users can register to an anycast group on the application level. This can be done by means of registration messages such as available in IGMP or the Multicast Listener Discovery Protocol (MLD). However, since each UE is only one IP hop away from the GGSN, there is currently no means for the GGSN to distinguish between different anycast group members in the same Public Land Mobile Network (PLMN). In case of large PLMNs the distance between the GGSN and the anycast members may vary significantly. This is especially valid in case of anycast on the Gp interface (i.e. between a GGSN and SGSN in different PLMNs). Thus, efficient anycasting is not currently supported in the PLMN. In case of multiple hosts in the anycast group in the PLMN, the GGSN must simply apply a round robin algorithm to select one of the clients. Therefore, the closest host is not always selected.

Mobile networks currently do not enable mobile clients to act as a distributed content cache and to redistribute the content to other clients. Data caching and distribution is, to a large extent, centrally controlled by a server in the network. Because of this limitation, content providers and/or network operators must either accept the fact that they cannot guarantee that multicast or broadcast clients can always retrieve the content, or they must provide other means for providing guaranteed delivery and retrieval. For example, they may utilize cyclic repeating, or add additional network resources such as additional caches in the network to guarantee that the data is not lost. These resources store the content itself, or store links to the content provider, in order for the client to retrieve the content from the content provider. In the latter case, the content retrieval path is longer and thus more expensive for the content provider, the network operator, and inherently also for the end-user.

SUMMARY OF THE INVENTION

The present invention enables mobile clients to cache data content that has been distributed to a plurality of clients, and to redistribute the content from the cache to other users. The initial distribution may have been made by means of broadcast, multicast, or a plurality of unicast messages. Then, using anycast techniques applied to the PLMN, a user who desires to retrieve data that was distributed earlier, locates the nearest user that has the content available, and asks the nearest user to forward the content. The "nearest" user may be the closest user, but may also be the optimal user from a Quality of Service (QoS) point of view. The network maintains control of the redistribution, and may charge the requesting user for the content and/or may provide an incentive award to the user who forwards the content.

Thus, in one aspect, the present invention is directed to a distributed caching and redistribution system for caching and redistributing data content in a wireless data network. The system includes transmission means for transmitting in an initial data transmission from the network, the data content to mobile clients operating in the wireless data network; and at least one redistributing mobile client that receives and caches the data content. The system also includes a requesting mobile client that requests the data content following the initial transmission of the data content by the transmission means; and redistribution means for redistributing the data content from the redistributing mobile client to the requesting mobile client. The system may also include a charging and billing server that charges the requesting mobile client for the data content after the data content is redistributed to the requesting mobile client. Optionally, the charging and billing server may provide an incentive to the redistributing mobile client after the redistributing mobile client offers to redistribute the data content or completes the redistribution of the data content to the requesting mobile client.

In another aspect, the present invention is directed to a method of caching and redistributing data content in a wireless data network. The method includes the steps of transmitting in an initial data transmission by the network, the data content to mobile clients operating in the wireless data network; and receiving and caching the data content by at least one redistributing mobile client. The method also includes requesting by a requesting mobile client, the data content following the initial transmission of the data content; and redistributing the data content from the redistributing mobile client to the requesting mobile client.

In yet another aspect, the present invention is directed to a redistributing mobile client for use in a distributed caching and redistribution system in a wireless data network. The redistributing mobile client caches data content received from the network, and redistributes the data content to a requesting mobile client. The redistributing mobile client includes a receiver for receiving the data content transmitted in an initial data transmission from the network; and a data memory for caching the received data content. The redistributing mobile client also includes a transmitter for transmitting the cached data content to an identified requesting mobile client; and a processor programmed to retrieve the cached data content from the data memory and send the data content to the transmitter in response to receiving a redistribution instruction identifying the requesting mobile terminal.

In still yet another aspect, the present invention is directed to a requesting mobile client for use in a distributed caching and redistribution system in a wireless data network. The requesting mobile client obtains from a redistributing mobile client, data content previously transmitted by the network to at least one redistributing mobile client. The requesting mobile client includes a transmitter that transmits a request for the previously transmitted data content; a processor programmed to send and receive anycast messages to a nearest redistributing mobile client having the data content available for redistribution; and a receiver for receiving the data content transmitted from the nearest redistributing mobile client.

DETAILED DESCRIPTION OF EMBODIMENTS

Figure 1:
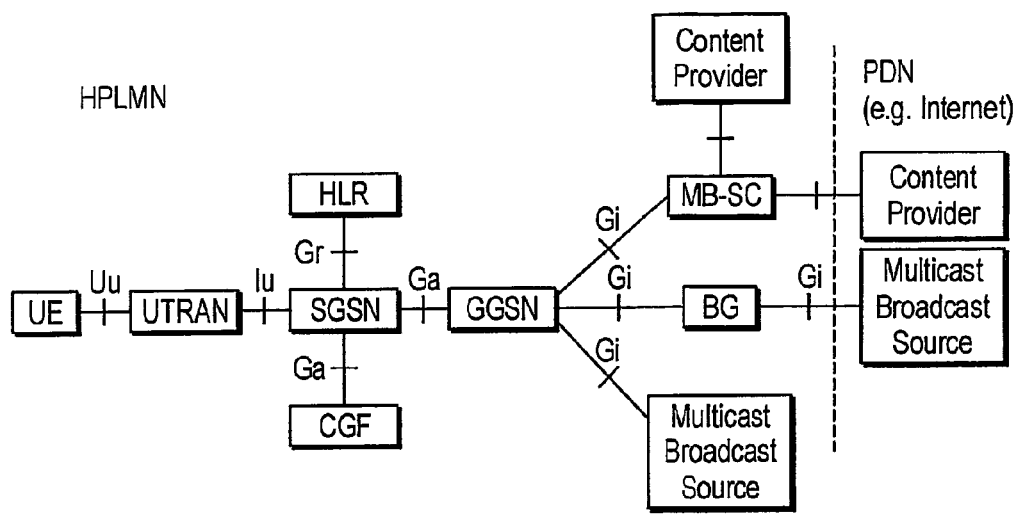
FIG. 1 (Prior Art) is a simplified block diagram illustrating the current Multimedia Broadcast/Multicast Service (MBMS) architecture.
Figure 2:
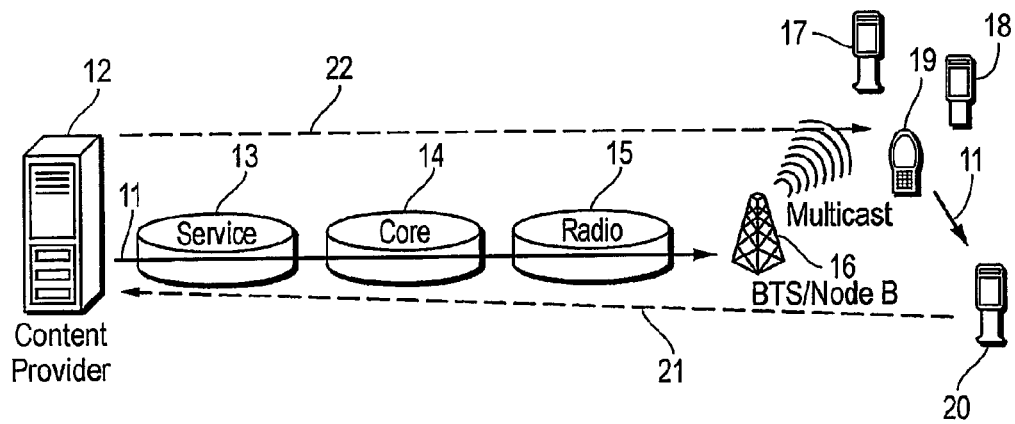
FIG. 2 is a simplified functional block diagram of an embodiment of the system of the present invention.

FIG. 2 is a simplified functional block diagram of an embodiment of the system of the present invention. Data content 11 from a content provider 12 is sent through a service 13, core 14, and radio network 15. At the radio network, the content is broadcast/multicast from a Base Transceiver Station (BTS) 16 to four mobile clients 17-20, and three out of the four clients (17-19) receive the content correctly. It should be recognized that although a BTS is illustrated and described herein as the means by which the content is transmitted, other transmission nodes may also be utilized. For example, the invention may utilize a Wideband Code Division Multiple Access (WCDMA) Node B, or WLAN radio equipment. The client 20 that did not receive the content, or did not receive it correctly, sends a query 21 to the network requesting the content from the nearest client capable of providing the content to him. The network sends an instruction 22 to the nearest client 19 that has the content, instructing the nearest client to send the content to the requesting client 20. The content 11 is redistributed from the nearest client to the requesting client.

The present invention integrates anycasting, which is well known from the Internet, into the PLMN. Mobile clients register to an anycast group and can be contacted via the anycast address. The anycast registration is performed on the IP application layer, whereas the anycast transmission in the PLMN is performed on the IP transport level.

Figure 3:
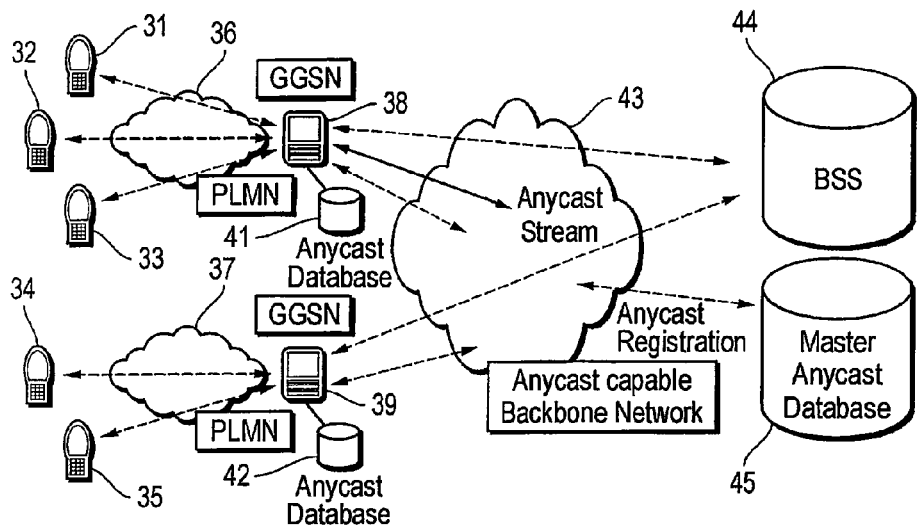
FIG. 3 is a simplified block diagram of an overall architecture of a wireless data network in which anycasting has been implemented.

FIG. 3 is a simplified block diagram of an overall architecture of a wireless data network in which anycasting has been implemented. Mobile clients 31-35 operate in PLMNs 36 and 37, which are served by GGSNs 38 and 39, respectively. Each of the GGSNs may be associated with a respective Anycast Database 41 and 42. The GGSNs communicate with each other and with other network entities through a backbone network 43 capable of carrying anycast messages. A Home Subscriber Server (HSS) 44 stores subscriber profile and location information, and a Master Anycast Database 45 stores anycast registration information.

Different variations of the anycasting procedure are possible. In a first embodiment, the following procedures are utilized: (1) retrieval of distance information by determining the distances between the BTS/Node Bs in the PLMN and the GGSN; (2) registration of mobile hosts in the anycast group; (3) propagation of anycast membership information by the GGSN onto the backbone network; and (4) reception and processing of anycast data in the PLMN.

In order to limit the signaling and processing delay when mobile hosts register to the anycast group, it is more efficient to determine the distance between the BTS/Node Bs in advance. Note that this determination can also be done when a mobile host registers from a specific BTS/Node B. The information can then be stored for later reference. There are two basic approaches for the GGSN to determine the distances (e.g. delay distance) towards the BTS/Node Bs. First, based on the known configuration of the network, depending on the IP routing protocol used within the PLMN, the GGSN may implicitly know the distance towards each of the routers in the BTS/Node B from the routing protocol tables. Second, BTS/Node Bs may register with the GGSN as transport anycast group members by means of the Internet Group Management Protocol (IGMP), the Neighbor Discovery Protocol, the Multicast Listener Discovery Protocol (MLD), or any dedicated protocol.

Figure 4:
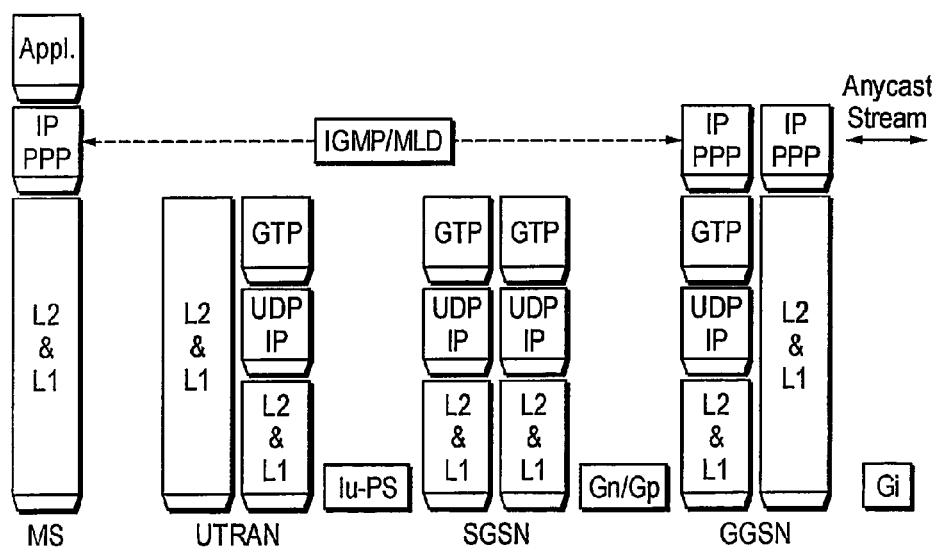
FIG. 4 is an illustrative drawing of a protocol stack utilized to transport an anycast stream between network elements in the PLMN according to the present invention.

FIG. 4 is an illustrative drawing of a protocol stack utilized to transport an anycast stream between network elements in the PLMN. The registration of mobile stations (MSs) may, for example, be performed by utilizing a new message in the IGMP or the MLD. Currently in the specifications, the GGSN does not have information about the cell (BTS/Node B) where the mobile is roaming. However, the SGSN has the cell id stored in the Packet Data Protocol (PDP) context information for the mobile host. Furthermore, the SGSN knows the BTS/Node B that belongs to the cell id. In case of an IP-based radio network, the SGSN knows the IP address of the BTS/Node B.

The GGSN retrieves the IP address of the BTS/Node B from the SGSN by means of new GPRS Tunneling Protocol (GTP) information elements or messages, or by means of a dedicated request/reply protocol between the GGSN and the SGSN. Optionally, the SGSN performs subscription or charging analyses and replies with a positive or negative anycast registration result to the GGSN. The GGSN optionally then informs the mobile host about the outcome. Additionally, the GGSN also performs analyses and completes the anycast registration. The mobile hosts are added to a table in the GGSN. If more than one mobile host is registered for the same anycast group in the same BTS/Node B, or if multiple hosts are registered to the same anycast group with the same distance between the GGSN and the corresponding BTS/Node Bs, the GGSN may, for example, apply a round-robin scheduling to select one of the anycast group members. Optionally, other characteristics, as shown in Table 1 below, are taken into account for the selection. It is anticipated that the "QoS Profile Negotiated" information element will be used most often to select anycast group members.

TABLE 1

| Field | Description | GSM | UMTS |
|---|---|---|---|
| IMSI | International Mobile Subscriber Identity. | X | X |
| NSAPI | Network layer Service Access Point Identifier. | X | X |
| MSISDN | The basic MSISDN of the MS. | X | X |
| PDP Type | PDP type, e.g., PPP or IP. | X | X |
| PDP Address | PDP address, e.g., an IP address. | X | X |
| Dynamic Address | Indicates whether PDP Address is static or dynamic. | X | X |
| APN in Use | The APN Network Identifier currently used. | X | X |
| TEID | Tunnel Endpoint Identifier. | X | X |
| TFT | Traffic flow template. | X | X |
| QoS Profile Negotiated | The quality of service profile negotiated. | X | X |
| SGSN Address | The IP address of the SGSN currently serving this MS. | X | X |
| MNRG | Indicates whether the MS is marked as not reachable for PS at the HLR. | X | X |
| Recovery | Indicates if the SGSN is performing database recovery. | X | X |
| GTP-SND | GTP-U sequence number of the next downlink N-PDU to be sent to the SGSN. | X | X |
| GTP-SNU | GTP-U sequence number of the next uplink N-PDU to be received from the SGSN. | X | X |
| Charging Id | Charging identifier, identifies charging records generated by SGSN and GGSN. | X | X |
| Charging Characteristics | The charging characteristics for this PDP context, e.g., normal, prepaid, flat-rate, and/or hot billing. | X | X |
| Trace Reference | Identifies a record or a collection of records for a particular trace. | X | X |
| Trace Type | Indicates the type of trace. | X | X |
| Trigger Id | Identifies the entity that initiated the trace. | X | X |
| OMC Identity | Identifies the OMC that shall receive the trace record(s). | X | X |

The GGSN propagates the anycast membership information for the first member in the PLMN towards the backbone network. At reception of data for the anycast group in the GGSN, the GGSN determines the corresponding nearest or optimal anycast group member, depending on a predefined metric. This determination is may be made, for example, by looking in the established anycast distance tables for the mobile host that belongs to the nearest BTS/Node B. Further processing of the data towards that mobile host is then performed according to the current standards.

This architecture and methodology provide an efficient and flexible selection mechanism to determine the appropriate, i.e. the nearest, host from an anycast group in a PLMN. The nearest can be defined according to any metric applicable to the routing protocols.

Figure 5:
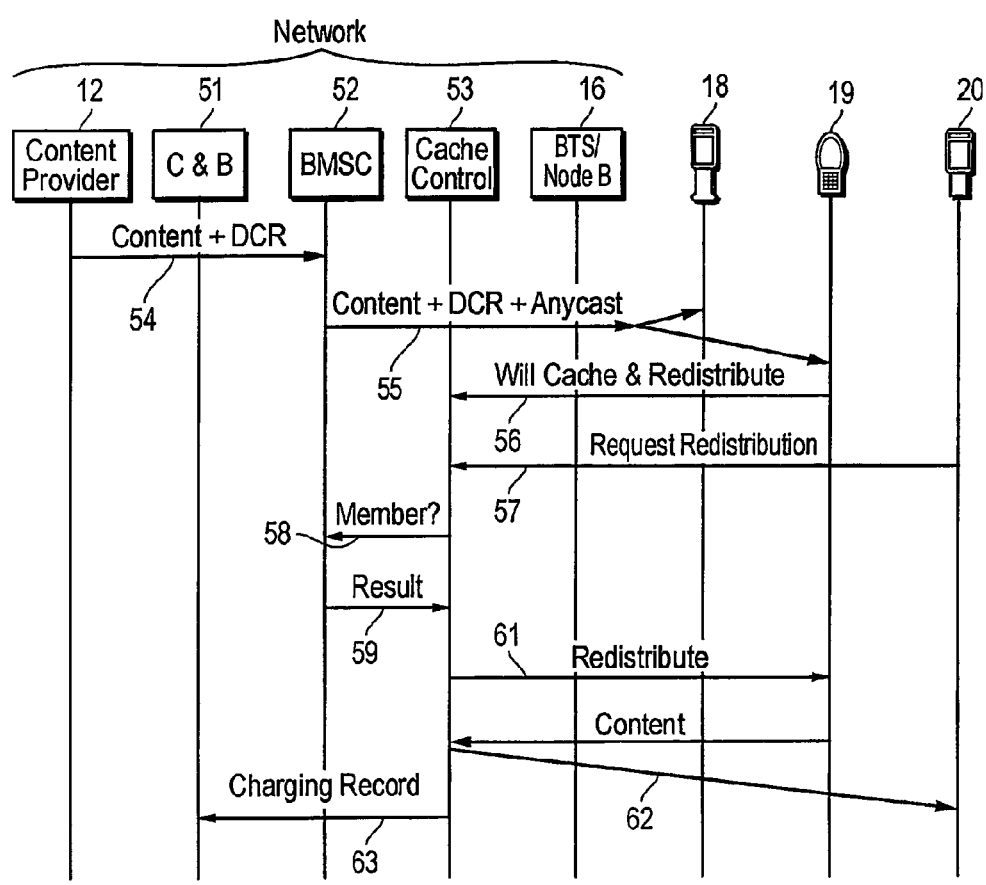
FIG. 5 is a signaling diagram illustrating the flow of signaling messages between various network entities in the embodiment of the present invention shown in FIG. 2.

FIG. 5 is a signaling diagram illustrating the flow of signaling messages between various network entities in the embodiment of the present invention shown in FIG. 2. The entities include the content provider 12, a charging and billing (C&B) server 51, a Broadcast/Multicast Service Center (BMSC) 52 as defined in the MBMS standards, a cache control server 53, and the BTS/Node B 16. For illustrative purposes, three mobile clients 18-20 are also shown. At 54, the content provider sends the content to the BMSC. The content may be files, multimedia messages (e.g., coming from a multimedia messaging centre, MMC), short messages, streaming video or audio, and the like. In addition to the actual content, the content provider sends a distributed caching request (DCR) indicator to inform the BMSC that distributed caching is preferred. Optionally, the DCR indicator may be generated by the BMSC. In another option, the BMSC may remove the DCR when the BMSC, for some reason, does not desire to have clients cache and redistribute the content.

At step 55, the BMSC 52 forwards the content and the DCR indicator to a corresponding geographical area (broadcast) or forwards the content to those geographical areas that have many registered clients (multicast). Furthermore, an anycast address is included and used by the clients 18-20 to inform the network (for example, the dedicated cache control server 53 in the network) that they are willing to cache and redistribute the content. The clients may be, for example, mobile phones with a 128 MB Sony memory-stick that enables the phones to store the content for some time. In this example, the content is correctly received by mobile clients 18 and 19. At step 56, the receiving clients register with the network, their willingness to cache and redistribute the content. The clients may register using anycast messages or other suitable registration mechanisms. When using anycast, either the cache control server or the BMSC stores the broadcast-anycast or multicast-anycast address combinations for later use. Additional information may be sent together with this anycast message, as preferred by the sending client. The additional information may include, for example, the capabilities of the client to redistribute the content using a variety of communication protocols such as GSM, WCDMA, and Bluetooth, as well as information such as presence information, times when the client is available, and the like.

At step 57, the mobile client 20 that did not receive the content, or did not receive the content correctly, requests the network to redistribute the content. This may also be a general request to the network like "has any news for multicast group 123 been distributed in the last 24 hours?" A web page may contain a table with entries that reflect the times when content was distributed for a specific broadcast or multicast address. Alternatively, a regular notification message may contain this information. The request to redistribute the content may include redistribution preferences like the bearers, the time, presence information, and the like. Alternatively, a link may be provided to the presence information in order for the network to retrieve the information from there.

In case multicasting is being used, the cache control server 53 may optionally check with the BMSC 52 at step 58 to determine whether the requesting client 20 is part of the multicast group. Whether or not multicasting is being used, the cache control server may also check with other servers to determine whether the requesting client is otherwise authorized to receive the content. After an analysis, the BMSC (or other server) returns the result back to the cache control server at step 59. In case of an unsuccessful analysis result, the cache control server may optionally inform the requesting client that the content is not available. In case of a successful result, the cache control server instructs one of the registered redistributing clients such as client 19 to send the content to the requesting client at step 61. The selection of the redistributing client 19 may be based on the criteria for anycasting in a PLMN or on the preferences sent by the requesting client. At step 62, the redistributing client 19 sends the content to the requesting client 20. This may be done via any of the available circuit-switched or packet-switched bearers or a combination of these. At step 63, the cache control server sends a charging record to the C&B server 51 so that the requesting client 20 may be charged for the content. In addition, a predefined incentive may be provided to the redistributing client 19. The predefined incentive is preferably handled in the C&B server, and may include for example, upgrading the client's account, reducing a previous charge, or reducing or eliminating the charge for the current content that is being forwarded.

In case DRM applies, the content and the rights are treated separately. The sequence shown in FIG. 5 describes the redistribution of the content, but the requesting client 20 still needs to retrieve the rights to be able to use the content. The BMSC 52 and the cache control server 53 may be collocated in a single unit. At step 56, instead of anycasting, a client capable of redistributing content may inform the network of its availability through a basic messaging system. In case of an unsuccessful analysis result at step 59, the optional message to the requesting client may contain the address of the content provider 12 (forwarded from the BMSC via the cache control server). The requesting client can then use this address to retrieve or attempt to retrieve the content from the content provider directly. Following delivery of the content at step 62, the requesting client may optionally send a content reception confirmation to the cache control server, upon which the cache control server informs the C&B server 51 to modify the charging accordingly.

Figure 6:
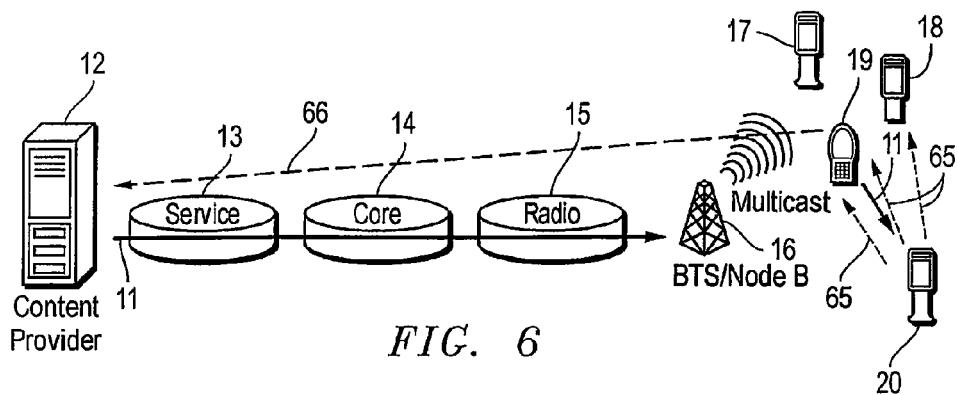
FIG. 6 is a simplified functional block diagram of another embodiment of the system of the present invention.

FIG. 6 is a simplified functional block diagram of another embodiment of the system of the present invention. Data content 11 from the content provider 12 is sent through the service 13, core 14, and radio network 15. At the radio network, the content is broadcast/multicast from the BTS 16 to four mobile clients 17-20, and three out of the four clients receive the content correctly. The client 20 that did not receive the content, or did not receive it correctly, transmits requests 65 locally in search of clients that can redistribute the content to him. A client 19 that hears this request first informs the network at 66 that it cached the content, and then redistributes it to the requesting client. The network is notified so that charging data can be handled accordingly.

Figure 7:
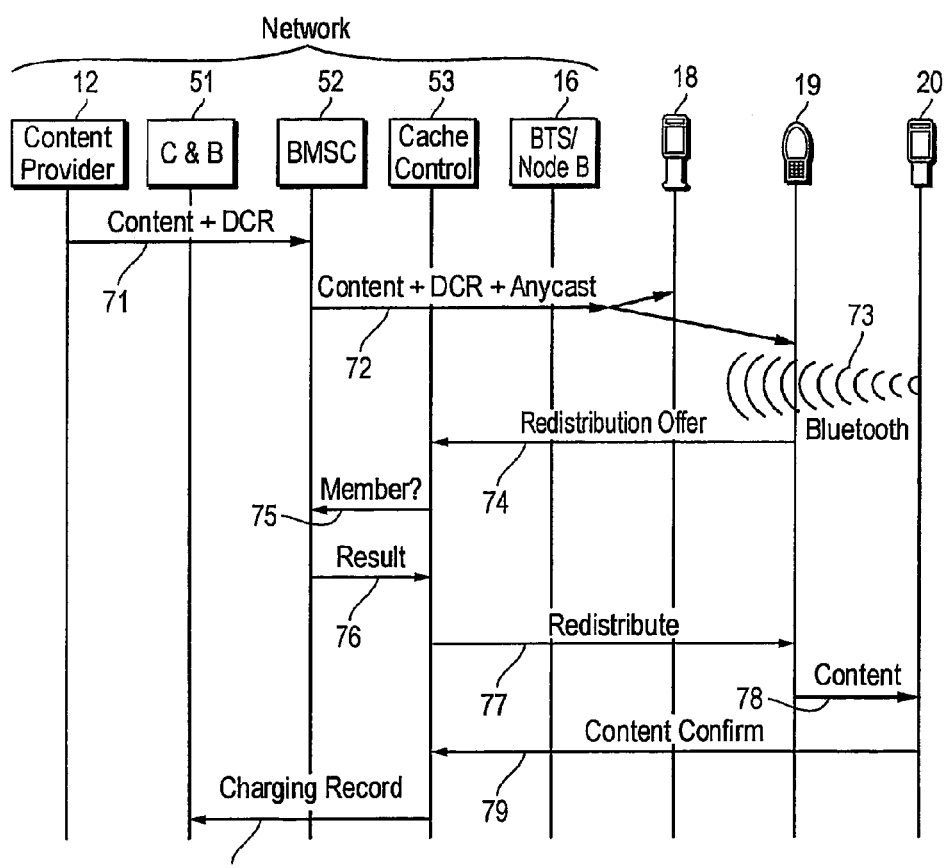
FIG. 7 is a signaling diagram illustrating the flow of signaling messages between various network entities in the embodiment of the present invention shown in FIG. 6.

FIG. 7 is a signaling diagram illustrating the flow of signaling messages between various network entities in the embodiment of the present invention shown in FIG. 6. In this embodiment, a local interface such as, for example Bluetooth, is utilized between the requesting and redistributing client. At 71, the content provider 12 sends the content and DCR indicator to the BMSC 52. Optionally, the DCR indicator may be generated by the BMSC. In another option, the BMSC may remove the DCR when the BMSC, for some reason, does not desire to have clients cache and redistribute the content. At step 72, the BMSC 52 forwards the content, the DCR indicator, and an anycast address to a plurality of clients using suitable transmission methods. For example, the content and DCR indicator may be forwarded to a corresponding geographical area (broadcast) or forwarded to those geographical areas that have many registered clients (multicast). In this example, the content is correctly received by mobile clients 18 and 19. At step 73, the mobile client 20 that did not receive the content, or did not receive the content correctly, determines whether other nearby clients received the content. This check can be based on the same request messages as described in step 57 of FIG. 5. An example of technology that may be utilized here is Bluetooth. Redistribution characteristics (e.g. bearer, QoS, time, etc.) may be agreed upon via this local interface. The check may ask whether any receiving client is part of a particular multicast group, and if someone answers, the requesting client may further inquire whether the answering client cached any content within a predefined time period such as, for example, three days. The mobile client 20 may also send a general request to the network inquiring whether any new content has been distributed.

At step 74, a redistributing client 19 that receives the request and is able and willing to redistribute the content, first contacts the cache control server 53 with an offer to redistribute the content in order to get permission to do so. The permission request message optionally includes the agreed redistribution characteristics. If multicasting is being used, the cache control server 53 checks with the BMSC 52 at step 75 to determine whether the requesting client 20 is part of the multicast group. Whether or not multicasting is being used, the cache control server may also check with other servers to determine whether the client is otherwise authorized to receive the content. After an analysis, the BMSC (or other server) returns the result back to the cache control server at step 76. At step 77, the cache control server provides permission for the redistributing client 19 to redistribute the content to the requesting client 20. At step 78, the redistributing client sends the content to the requesting client via the local interface unless another way of redistributing was previously agreed upon. The requesting client confirms the reception of the content from the redistributing client at step 79, and at step 80, the cache control server sends a charging record to the C&B server 51 so that the requesting client 20 may be charged for the content. In addition, a predefined incentive may be provided to the redistributing client 19. In case DRM is applied, and the rights are separated from the content, steps 74-77 may be omitted because the network knows from the confirmation at step 79 that a content redistribution has taken place.

Figure 8:
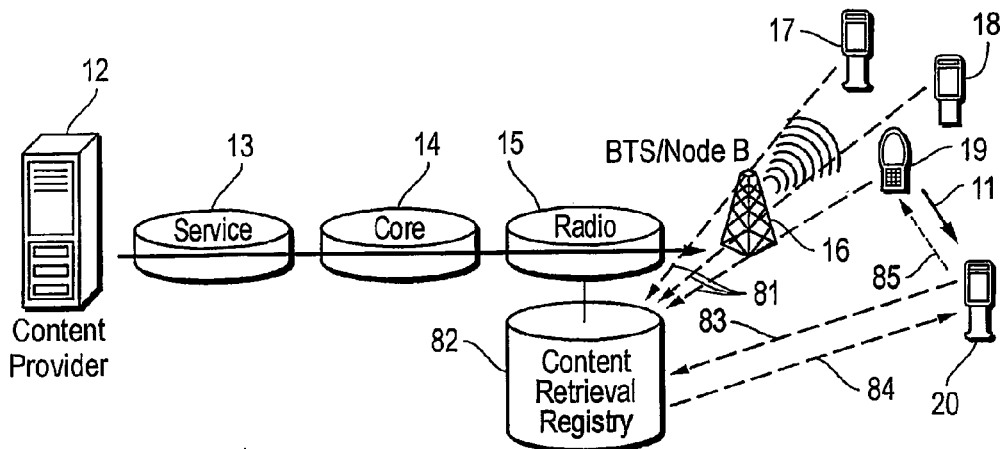
FIG. 8 is a simplified functional block diagram of another embodiment of the system of the present invention.

FIG. 8 is a simplified functional block diagram of another embodiment of the system of the present invention. Data content 11 from the content provider 12 is sent through the service 13, core 14, and radio network 15. At the radio network, the content is broadcast/multicast from the BTS/Node B 16 to four mobile clients 17-20, and three out of the four clients receive the content correctly. In this embodiment, clients 17-19 that received the content successfully, and that support the distributed cache methodology, send messages 81 to a Content Retrieval Registry (CRR) 82, registering the fact that they have the content available. The CRR may be a central registry, may be co-located in the content server or the cache control server, or may be a distributed registry. At 83, the client 20 that did not receive the content, or did not receive it correctly, asks the CRR which of the mobile clients has the content available. Preferably, the identification of the nearest client capable of redistributing the content is then provided to the requesting client at step 84. The requesting client then contacts the nearest client at 85, and the content 11 is then redistributed to the requesting client from the nearest client having the content available.

Figure 9:
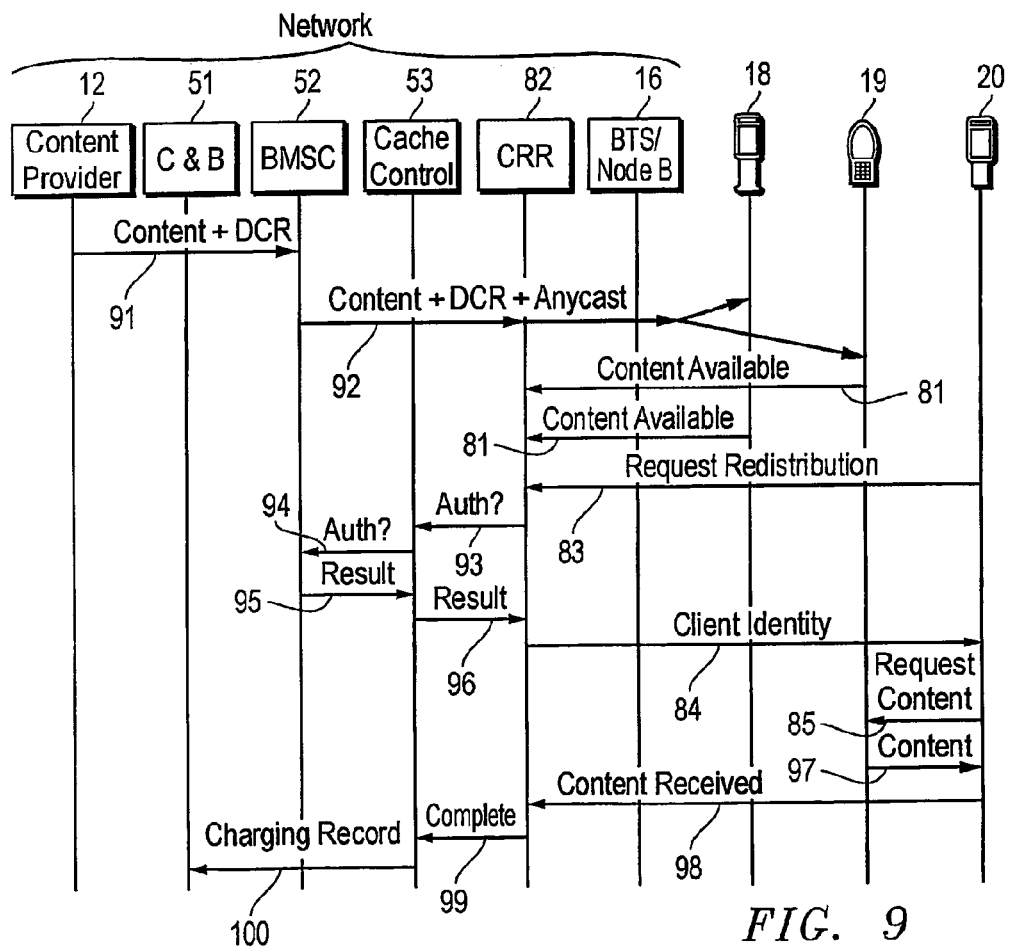
FIG. 9 is a signaling diagram illustrating the flow of signaling messages between various network entities in the embodiment of the present invention shown in FIG. 8.

FIG. 9 is a signaling diagram illustrating the flow of signaling messages between various network entities in the embodiment of the present invention shown in FIG. 8. For illustrative purposes, three mobile clients 18-20 are also shown. At 91, the content provider sends the content to the BMSC 52. In addition to the actual content, the content server sends a DCR indicator to inform the BMSC about this preference. Optionally, the DCR indicator may be generated by the BMSC. In another option, the BMSC may remove the DCR when the BMSC, for some reason, does not desire to have clients cache and redistribute the content. At step 92, the BMSC forwards the content and the DCR indicator to a plurality of clients using suitable transmission methods. For example, the content and DCR indicator may be forwarded to a corresponding geographical area (broadcast) or forwarded to those geographical areas that have many registered clients (multicast). Furthermore, an anycast address may be included and used by the clients 18-20 to inform the network (for example, the dedicated cache control server 53 in the network) that they are willing to cache and redistribute the content. In the example shown, mobile clients 18 and 19 receive the content.

The mobile clients 18 and 19 send messages 81 to the CRR 82, registering the fact that they have the content available. At step 83, the client 20 that did not receive the content, or did not receive it correctly, transmits a request for the content to the CRR 82. The mobile client 20 may also send a general request to the network inquiring whether any new content has been distributed. At step 93, the CRR queries the cache control server 53 to determine whether the requesting client 20 is authorized to receive the content. If multicasting is being used, the cache control server 53 checks with the BMSC 52 at step 94 to determine whether the requesting client 20 is part of the multicast group. Whether or not multicasting is being used, the cache control server may also check with other servers to determine whether the client is otherwise authorized to receive the content. After an analysis, the BMSC (or other server) returns the result back to the cache control server at step 95. In case of a successful result, the cache control server informs the CRR that the requesting client is authorized to receive the content at step 96. In case of an unsuccessful analysis result, the cache control server or CRR may optionally inform the requesting client that the content is not available. At step 84, the identification of the nearest client capable of redistributing the content is then provided to the requesting client. At step 85, the requesting client then requests the content from the nearest client 19, and at step 97, the content is redistributed from the nearest client 19 to the requesting client 20. At step 98, the requesting client informs the CRR that the content has been received. At step 99, the CRR sends an indication to the cache control server indicating that the redistribution is complete. At step 100, the cache control server then sends a charging record to the C&B server 51 so that the requesting client 20 may be charged for the content.

Figure 10:
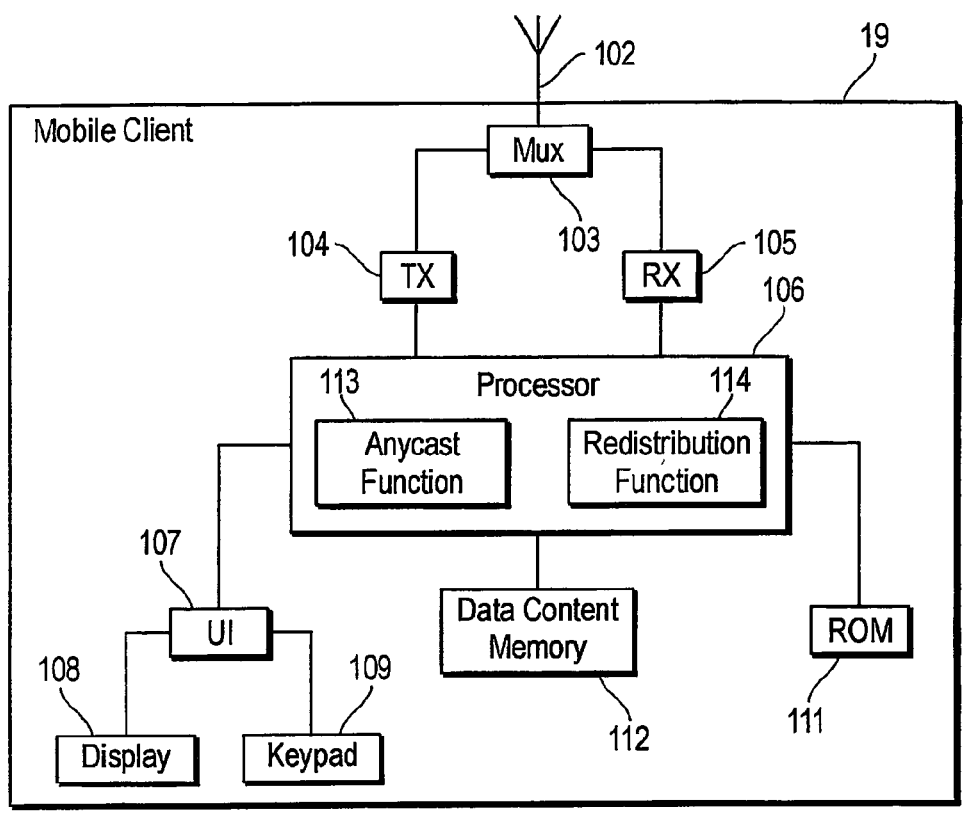
FIG. 10 is a simplified functional block diagram of a mobile client modified to cache and redistribute data content according to the present invention.

FIG. 10 is a simplified functional block diagram of a mobile client 19 modified to cache and redistribute data content according to the present invention. Radio frequency signals are transmitted and received through an antenna 102, which is connected through a multiplexer circuit 103 to a transmitter 104 and a receiver 105. The transmitter and receiver are connected to and controlled by a processor 106. A user interface 107 includes a display 108 and a keypad 109. The processor may retrieve programming instructions from a read only memory (ROM) 111. Data content 11 received by the mobile client is stored in a data content memory 112.

The processor 106 may optionally be programmed with an anycast function 113 that enables the mobile client to receive and understand anycast addresses, and to access the nearest of a group of mobile clients that share the same anycast address. The processor is also programmed with a redistribution function 114 that enables the mobile client to receive and understand the distributed caching request (DCR) indicator, to send messages to the cache control server 53 or the CRR 82 offering to redistribute cached content, to respond to instructions from the cache control server or CRR to redistribute the content to an identified requesting client, and to respond to requests from a requesting client to redistribute content to the requesting client.

The present invention provides an efficient solution for content providers and/or network operators to guarantee content reception at a later stage when content is distributed to a plurality of clients. It provides this guarantee when the content was not received at all or was not received correctly (and thus may not be usable). The solution is efficient because the content redistribution path is shortened in many cases, and no network resources are used for caching and redistributing the content. Instead, client devices that probably store the content for some time anyway, redistribute the content when requested. Thus, the content provider and/or network operator save network resources and thus money by applying such a distributed content cache. Therefore, the content provider and/or network operator may provide various incentives to clients who cache and redistribute the content. For example, the content provider may provide content or user rights free of charge, or the operator may provide a deduction on a client's monthly bill whenever the client volunteers or actually forwards the content to a requesting client.

Although the present invention has been described in detail with reference to only a few exemplary embodiments, those skilled in the art will appreciate that various modifications can be made without departing from the invention. Accordingly, the invention is defined only by the following claims, which are intended to embrace all equivalents thereof.

What is claimed is:

1. A distributed caching and redistribution system for caching and redistributing data content in a wireless data network, said system comprising:
   transmission means for transmitting in an initial data transmission from the network the data content directly to mobile clients operating in the wireless data network;
   at least one redistributing mobile client that receives and caches the transmitted data content;
   a requesting mobile client having means for requesting redistribution of the data content, wherein anycast messaging is utilized in the wireless data network to identify a redistributing mobile client determined to be the nearest redistributing mobile client having the content available; and
   wherein the identified redistributing mobile client includes redistribution means for redistributing the data content from the redistributing mobile client to the requesting mobile client in response to the redistribution request.

2. The distributed caching and redistribution system of claim 1 wherein the transmission means includes means for multicasting the data content to a group of mobile clients in a multicast group.

3. The distributed caching and redistribution system of claim 1 wherein the transmission means includes means for broadcasting the data content to all mobile clients operating in the wireless data network.

4. The distributed caching and redistribution system of claim 1 wherein the at least one redistributing mobile client includes:
   a data content memory for caching the received data content; and
   a processor programmed with a content redistribution function, said redistribution function enabling the redistributing mobile client to obtain an identification of the requesting mobile client and send the cached data content to the identified requesting mobile client.

5. The distributed caching and redistribution system of claim 4 wherein the content redistribution function enables the redistributing mobile client to obtain an identification of the requesting mobile client by notifying the network that the redistributing mobile client is available to redistribute the data content, and to receive a redistribution instruction message from the network containing the identification of the requesting mobile client.

6. The distributed caching and redistribution system of claim 4 wherein the content redistribution function enables the redistributing mobile client to obtain an identification of the requesting mobile client by receiving a query from the requesting mobile client, said query questioning whether the redistributing mobile client has the data content available for redistribution.

7. The distributed caching and redistribution system of claim 1 wherein the requesting mobile client includes means for requesting the data content from the network.

8. The distributed caching and redistribution system of claim 7 wherein the requesting mobile client includes means for requesting the data content from a cache control server in the network.

9. The distributed caching and redistribution system of claim 7 wherein the requesting mobile client includes means for requesting the data content from a content retrieval registry in the network.

10. The distributed caching and redistribution system of claim 1 wherein the requesting mobile client includes means for requesting the data content from a redistributing mobile client operating near the requesting mobile client.

11. The distributed caching and redistribution system of claim 1 wherein the redistribution means includes:
    means for determining whether the requesting mobile client is authorized to receive the requested data content; and
    means, responsive to determining that the requesting mobile client is authorized, for instructing a selected redistributing mobile client to redistribute the cached data content to the requesting mobile client.

12. The distributed caching and redistribution system of claim 11 further comprising a charging and billing server that charges the requesting mobile client for the data content after the data content is redistributed to the requesting mobile client.

13. The distributed caching and redistribution system of claim 12 wherein the charging and billing server also provides an incentive to the redistributing mobile client after the redistributing mobile client offers to redistribute the data content or completes the redistribution of the data content to the requesting mobile client.

14. A method of caching and redistributing data content in a wireless data network, said method comprising the steps of:
    transmitting in an initial data transmission by the network, the data content directly to mobile clients operating in the wireless data network;
    receiving and caching the transmitted data content by at least one redistributing mobile client;
    requesting by a requesting mobile client, redistribution of the data content following the initial transmission of the data content, wherein anycast messaging is utilized in the wireless data network to identify a redistributing mobile client determined to be the nearest redistributing mobile client having the content available; and
    redistributing the data content from the identified redistributing mobile client to the requesting mobile client in response to the redistribution request.

15. The method of caching and redistributing data of claim 14 wherein the step of redistributing the data content includes the steps of:
    obtaining by the redistributing mobile client, an identification of the requesting mobile client; and
    sending the cached data content from the redistributing mobile client to the identified requesting mobile client.

16. The method of caching and redistributing data of claim 15 wherein the step of obtaining an identification of the requesting mobile client includes the steps of:
    notifying the network that the redistributing mobile client is available to redistribute the data content; and
    receiving a redistribution instruction message from the network containing the identification of the requesting mobile client.

17. The method of caching and redistributing data of claim 15 wherein the step of obtaining an identification of the requesting mobile client includes receiving a query from the requesting mobile client, said query questioning whether the redistributing mobile client has the data content available for redistribution.

18. The method of caching and redistributing data of claim 14 wherein the step of requesting the data content by the requesting mobile client includes requesting the data content from the network.

19. The method of caching and redistributing data of claim 14 wherein the step of redistributing the data content includes the steps of:

determining whether the requesting mobile client is authorized to receive the requested data content; and upon determining that the requesting mobile client is authorized, instructing a selected redistributing mobile client to redistribute the cached data content to the requesting mobile client.

20. The method of caching and redistributing data of claim 14 further comprising charging the requesting mobile client for the data content after the data content is redistributed to the requesting mobile client.

21. The method of caching and redistributing data of claim 20 further comprising providing an incentive to the redistributing mobile client after the redistributing mobile client offers to redistribute the data content or completes the redistribution of the data content to the requesting mobile client.

22. A redistributing mobile client for use in a distributed caching and redistribution system in a wireless data network, said redistributing mobile client caching data content received from the network, and redistributing the data content to a requesting mobile client, said redistributing mobile client comprising:

a wireless receiver for receiving the data content transmitted in an initial data transmission from the network and an anycast address directly from a wireless data network, and for receiving an instruction to redistribute the data content to an identified requesting mobile client;

a data memory for caching the received data content;

a transmitter for transmitting the cached data content to the identified requesting mobile client; and a processor programmed to retrieve the cached data content from the data memory and send the data content to the transmitter in response to receiving the redistribution instruction identifying the requesting mobile client.

* * * * *

UNITED STATES PATENT AND TRADEMARK OFFICE
CERTIFICATE OF CORRECTION

| | | |
|---|---|---|
| PATENT NO. | : 7,515,872 B2 | |
| APPLICATION NO. | : 10/556179 | |
| DATED | : April 7, 2009 | |
| INVENTOR(S) | : Hundscheidt et al. | |

It is certified that error appears in the above-identified patent and that said Letters Patent is hereby corrected as shown below:

In Column 2, Line 6, delete "behalf" and insert -- behalf. --, therefor.

Signed and Sealed this

Twentieth Day of October, 2009

David J. Kappos
*Director of the United States Patent and Trademark Office*